UNITED STATES PATENT OFFICE.

JOSEPH P. R. JAMES, OF MUSCATINE, IOWA.

PROCESS OF PRODUCING SHELL-POWDERS.

No. 801,317.      Specification of Letters Patent.      Patented Oct. 10, 1905.

Application filed October 12, 1904. Serial No. 228,206.

*To all whom it may concern:*

Be it known that I, JOSEPH P. R. JAMES, a citizen of the United States, residing at Muscatine, in the county of Muscatine and State of Iowa, have invented a new and useful Process of Producing Shell-Powders, of which the following is a specification.

My invention relates to a process of reducing clam, oyster, and other like shells to a powder which is adapted for use alone or in conjunction with other ingredients as a tooth-powder or silver-polish and may also be employed as an ingredient in the production of a superior quality of pearl-wash, calcimine, putty, articles of tableware, buttons, and similar articles.

In carrying my process into practice I preferably employ clam or oyster shells or a suitable proportion of both kinds of shells.

The shells to be treated are bleached and dissolved by placing them in a solution of chlorid of lime and bran and heating them until soft and then placing them while hot in a solution of skimmed milk and ammonia. They are left in the latter solution for a period of from twenty-four to thirty-six hours and then removed therefrom and placed in a dry-kiln and subjected to heat until all moisture has been driven therefrom. Under the action of the solutions the shells are bleached and softened to such a condition that the driving off of the moisture therefrom in the kiln results in their reduction to a fine powder. This powder may be used alone or in conjunction with other ingredients as a tooth-powder or as a cleansing and polishing powder for silverware, &c. By incorporating a suitable quantity of the powder with oil a good pearl-wash or putty is produced, or by incorporating the powder with cement a plastic material is obtained which can be molded into buttons and various other articles and baked, the resultant articles being extremely hard and durable. Other kinds of ware may be made by mixing the powder with brick-dust, coal-ashes, or other waste matter, together with a suitable quantity of cement.

Instead of subjecting the shells to the action of separate solutions containing the chlorid of lime and ammonia they may be placed in a single solution in which these bleaching and softening elements are combined. I find that ten pounds of chlorid of lime and five pounds of crude ammonia dissolved in a sufficient amount of water to cover the shells will effect the reduction of one hundred pounds of shells to a softened state in about twenty-four hours.

The shells of other shell-fish may be used; but clam and oyster shells yield a superior quality of powder, and their use is preferred.

Having thus described my invention, I claim—

1. The herein-described process of making a shell-powder from shells of the class described, which consists in submerging the shells in a heated solution of chlorid of lime and bran, then removing them therefrom and placing the same in a heated solution of ammonia and skimmed milk, and then drying out the shells so softened by the action of heat in a kiln, whereby the softened shells are reduced to a dry powder, substantially as described.

2. The herein-described process of making a pure white or pearl-gray shell-powder from shells of the class described, which consists in submerging the shells in a solution containing chlorid of lime and bran, maintaining said solution in a heated state until the shells are bleached and partially softened, then submerging the shells in a solution containing ammonia and skimmed milk, maintaining said solution in a heated state and the shells therein until the shells are softened to a high degree, and then removing the shells and drying the same under a higher degree of heat in a dry-kiln whereby the shells are reduced to a dry powdery state, substantially as described.

In testimony whereof I affix my signature in presence of two witnesses.

JOSEPH P. R. JAMES.

Witnesses:
     ARTHUR HOFFMAN,
     MATHEW WESTRATE.